US012339623B2

(12) United States Patent
Favre et al.

(10) Patent No.: US 12,339,623 B2
(45) Date of Patent: Jun. 24, 2025

(54) DEVICE AND METHOD FOR ADJUSTING THE RATE AND CORRECTING THE STATE OF DISPLAY OF A WATCH

(71) Applicant: The Swatch Group Research and Development Ltd, Marin (CH)

(72) Inventors: Jerome Favre, Neuchatel (CH); Michel Willemin, Preles (CH); Jean-Jacques Born, Morges (CH); Dominique Lechot, Les Reussilles (CH); Gianni Di Domenico, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 709 days.

(21) Appl. No.: 17/647,733

(22) Filed: Jan. 11, 2022

(65) Prior Publication Data

US 2022/0137559 A1 May 5, 2022

Related U.S. Application Data

(62) Division of application No. 15/948,192, filed on Apr. 9, 2018, now Pat. No. 11,334,026.

(30) Foreign Application Priority Data

May 29, 2017 (EP) .................................... 17173302

(51) Int. Cl.
*G04B 17/00* (2006.01)
*G04B 17/20* (2006.01)
*G04D 7/12* (2006.01)

(52) U.S. Cl.
CPC ............. *G04B 17/00* (2013.01); *G04B 17/20* (2013.01); *G04D 7/1264* (2013.01); *G04D 7/1278* (2013.01)

(58) Field of Classification Search
CPC ...... G04B 17/00; G04B 17/20; G04D 7/1264; G04D 7/1278

(Continued)

(56) References Cited

U.S. PATENT DOCUMENTS

| | | |
|---|---|---|
| 6,768,704 B1 | 7/2004 | Kawaguchi |
| 10,539,928 B2 | 1/2020 | Born |

(Continued)

FOREIGN PATENT DOCUMENTS

| | | |
|---|---|---|
| DE | 10 2013 012 854 B3 | 5/2014 |
| GB | 187814 | 11/1922 |
| JP | 55-67685 | 5/1980 |

OTHER PUBLICATIONS

Henrique M. Oliveira et al. "Huygens synchronization of two clocks," Scientific Reports, vol. 5, No. 1, 2015 (Year: 2015).*

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

Method for adjusting the rate of a basic oscillator of a watch arranged to oscillate at a nominal frequency N0, with a master oscillator generating an excitation frequency NE approximately equal to an integer multiple of this nominal frequency N0, the master oscillator subjecting the watch to excitation or a modulated motion during a transition phase after which the basic oscillator is stabilised at the excitation frequency NE, and a state of display correction method with a winder for mechanical or automatic watches, moving a support carrying the watch and comprising a state of display correction oscillator, having a lower variation of rate value than the initial variation of rate value DI of this basic oscillator, and oscillating at a correction frequency NC to (Continued)

impose oscillation or a motion on the watch, during a state of display correction phase whose duration is adjusted to exactly correct a state of display error measured at the initial moment of actuation.

13 Claims, 4 Drawing Sheets

(58) Field of Classification Search
USPC ............................................................ 368/28
See application file for complete search history.

(56) References Cited

U.S. PATENT DOCUMENTS

| | | | |
|---|---|---|---|
| 11,036,183 | B2 | 6/2021 | Macias Garza |
| 2005/0254352 | A1* | 11/2005 | Wolf V .................. G04B 3/006 368/206 |
| 2007/0223319 | A1 | 9/2007 | Hill |
| 2010/0165798 | A1 | 7/2010 | Huang |
| 2010/0165799 | A1 | 7/2010 | Huang |
| 2011/0026374 | A1 | 2/2011 | Chang |
| 2015/0117164 | A1 | 4/2015 | Ng |
| 2015/0143957 | A1 | 5/2015 | Liao |
| 2016/0004223 | A1 | 1/2016 | Willemin |
| 2018/0341225 | A1 | 11/2018 | Favre |
| 2018/0341226 | A1 | 11/2018 | Favre |
| 2019/0146420 | A1 | 5/2019 | Piguet |

OTHER PUBLICATIONS

European Search Report issued in European application 17173302.5 on Nov. 3, 2017 (w/ English Translation of Categories Cited).
Henrique M. Oliveira et al. “Huygens synchronization of two clocks,” Scientific Reports, vol. 5, No. 1, 2015, 10.1038/srep11548.
H. Wallman,“Hit-or-Miss Synchronisation to Atomic Time” Horological Journal, vol. 134, No. 1, Jul. 1991.
Jonatan Pena Ramirez et al., “The sympathy of two pendulum clocks: beyond Huygens’ observations,” Scientific Reports, vol. 6, No. 1, 2016.
Chinese Office Action issued in Patent Application No. 201810520723.2 on Sep. 8, 2020.

* cited by examiner

DEVICE AND METHOD FOR ADJUSTING THE RATE AND CORRECTING THE STATE OF DISPLAY OF A WATCH

CROSS-REFERENCE TO RELATED APPLICATIONS

This application is a division of U.S. patent application Ser. No. 15/948,192 filed Apr. 9, 2018, which claims priority from European Patent Application No. 17173302.5 filed May 29, 2017, the entire disclosure of each of which is hereby incorporated herein by reference.

FIELD OF THE INVENTION

The invention concerns a method for correcting the state of display of a watch or respectively a movement, said watch or respectively said movement comprising at least one basic oscillator arranged to generate oscillation at a nominal frequency.

The invention also concerns a method for adjusting the rate and correcting the state of display of a watch or respectively a movement, said watch or respectively said movement comprising at least one basic oscillator arranged to generate oscillation at a nominal frequency.

The invention concerns a state of display correction device for correcting the state of display of a watch or respectively a movement, said watch or respectively said movement comprising at least one basic oscillator arranged to generate oscillation at a nominal frequency.

The invention concerns a device for adjusting the rate and correcting the state of display of a watch or respectively a movement, said watch or respectively said movement comprising at least one basic oscillator arranged to generate oscillation at a nominal frequency.

The invention concerns an interactive support device for interactive correction of a watch or respectively a movement.

The invention concerns a watch or respectively a movement, said watch or respectively said movement comprising at least one basic oscillator arranged to generate oscillation at a nominal frequency.

The invention concerns the use of a state of display correction device comprising a master oscillator arranged to generate excitation oscillation at an excitation frequency which is approximately equal to, or equal to a nominal frequency, or to an integer multiple of said nominal frequency, and comprising a state of display correction oscillator arranged to generate a correction oscillation at a correction frequency, for correcting the state of display of a watch or respectively a movement, comprising at least one basic oscillator arranged to generate oscillation at said nominal frequency.

The invention concerns the use of a device for adjusting the rate and correcting the state of display of a watch or respectively a movement, said watch or respectively said movement comprising at least one basic oscillator arranged to generate oscillation at a nominal frequency with an initial variation of rate value, said rate adjustment and state of display correction device comprising a master oscillator arranged to generate excitation oscillation at an excitation frequency which is approximately equal to, or equal to a nominal frequency, or to an integer multiple of said nominal frequency, with a master variation of rate value with respect to a reference, said rate adjustment and state of display correction device further comprising a state of display correction oscillator arranged to generate correction oscillation at a correction frequency, for adjusting the rate and correcting the state of display of a watch or respectively a movement, comprising at least one basic oscillator arranged to generate oscillation at said nominal frequency.

The invention concerns the use of an automatic winder for mechanical or automatic watches, with at least one support for receiving a watch or respectively a movement, for subjecting at least one entire watch or respectively one entire movement to excitation oscillation generated by a master oscillator arranged to generate excitation oscillation at an excitation frequency which is approximately equal to, or equal to a nominal frequency, or to an integer multiple of said nominal frequency, with a master variation of rate value with respect to a reference.

BACKGROUND OF THE INVENTION

Controlling the rate, and particularly the value of the variation of daily rate of a watch or respectively a movement is the objective of every watch designer.

The maximum variation of daily rate of a watch or respectively a standard mechanical movement, with no particular certification, is on the order of 5 to 10 seconds per day, which may be a loss or a gain.

The maximum variation of daily rate of a highly crafted watch, or respectively a highly crafted mechanical movement, particularly with chronometer certification, is from 2 to 5 seconds per day.

The maximum variation of daily rate of a very highly crafted watch (or respectively mechanical movement), for example prepared for a chronometer competition, is on the order of 1 second per day.

Variation of rate drifts, in particular, according to the level of unwinding of the barrel, but also, non-exhaustively, with environmental, temperature, humidity or other variations, with the wear of the various moving parts, and with the degradation of lubricants over time, and of course the position of the watch in the gravitational field.

Controlling the error of state of display is an additional concern to that of controlling the rate.

Automatic winders are designed for winding mechanical or automatic or manual watches, but simply move the oscillating weight, or rotate the crown, to rewind the barrel, without correcting either the rate or the state of the watch. When the user leaves his watch for a long time on such a winder, the displayed time drifts continuously and in an uncontrolled manner.

Breguet made a "sympathetic" pendulum, comprising a specific watch, or respectively movement, associated with a pendulum serving as a reference, and arranged to be held on the pendulum, with a mechanism for resetting the hands of the watch, at midnight and at midday, by means of the control stem of the watch, moved by the pendulum.

Various scientific articles mention synchronisation or sympathy between two clocks:

H. M. Oliveira et Al.: "Huygens synchronization of two clocks", Scientific Reports, vol. 5, No 1, 23 Jul. 2015, XP055418276, DOI:10.1038/srep11548; page 9, § experimental, FIGS. 4, 7;

H. Wallman: "Hit-or-miss synchronization to atomic time", Horological Journal. Ashford, GB, Vol. 134, No 1, 1 Jul. 1991, pages 26-27, XP000214989, ISSN: 0018-5108, pages 1-2, FIGS. 2-3;

J. P. Ramirez et Al.: "The sympathy of two pendulum clocks: beyond Huygens' observations", Scientific Reports, Vol. 6, No 1, 29 Mar. 2016, XP055418277, DOI:10.1038/srep23580, page 3, § experimental, FIGS. 3-6.

UK Patent GB187814A in the name of W H Shortt describes a pendulum clock synchronized with another by means of electric pulses which are used to operate a device associated with the slave pendulum as soon as the latter lags behind by more than a predetermined value.

Japanese Patent Application JPS5567685A in the name of SEIKO describes a configuration for recalibrating the rate of an alarm watch, by using its sound generating means as receiving means, in combination with a signal corresponding to a predetermined sound.

German Patent DE102013012854B3 in the name of R Goder describes a watch support comprising means adapted for correcting the rate of the watch, by modifying its position, the temperature of the environment, or its level of wind, according to the deviation of the display position evidenced by an electronic camera, a proximity detector or a sensor, especially an acoustic sensor.

SUMMARY OF THE INVENTION

The invention proposes to precisely control the frequency of at least one watch, or respectively one mechanical movement, having at least one oscillator, and which oscillates with the aid of a device or instrument or support. Each watch is fixed on a support, which has access to a reference time base. The support imparts an oscillating motion to the mechanical watch, which imposes a reference frequency on the balance spring of the watch, or more generally on its oscillator.

It is an object of the invention to achieve a periodic back and forth motion of the entire watch, without removing the movement from its case, in order to control the frequency of its mechanical resonator.

To this end, the invention concerns a method for correcting the state of display of a watch, or respectively a movement, said watch or respectively said movement comprising at least one basic oscillator arranged to generate oscillation at a nominal frequency, according to claim 1.

The invention also concerns a method for adjusting the rate and correcting the state of display of a watch or respectively a movement, wherein said watch or respectively said movement comprises at least one basic oscillator arranged to generate oscillation at a nominal frequency with an initial variation of rate value, according to claim 2.

The invention also concerns a state of display correction device for correcting the state of display of a watch or respectively a movement, wherein said watch or respectively said movement comprises at least one basic oscillator arranged to generate oscillation at a nominal frequency with an initial variation of rate value, according to claim 3.

The invention also concerns a device for adjusting the rate and correcting the state of display of a watch or respectively a movement, wherein said watch or respectively said movement comprises at least one basic oscillator arranged to generate oscillation at a nominal frequency with an initial variation of rate value, according to claim 7.

The invention also concerns an interactive support device for correction of a watch or respectively a movement, according to claim 8.

The invention also concerns a watch, said watch comprising at least one basic oscillator arranged to generate oscillation at a nominal frequency with an initial variation of rate value, according to claim 12.

The invention also concerns the use of a state of display correction device comprising a master oscillator arranged to generate excitation oscillation at an excitation frequency which is approximately equal to, or equal to a nominal frequency, or to an integer multiple of said nominal frequency, with a master variation of rate value with respect to a reference, and comprising a state of display correction oscillator arranged to generate correction oscillation at a correction frequency, for correcting the state of display of a watch, or respectively a movement, said watch or respectively said movement comprising at least one basic oscillator arranged to generate oscillation at said nominal frequency.

The invention also concerns the use of a device for adjusting the rate and correcting the state of display of a watch or respectively a movement, said watch or respectively said movement comprising at least one basic oscillator arranged to generate oscillation at a nominal frequency with an initial variation of rate value, said rate adjustment and state of display correction device comprising a master oscillator arranged to generate excitation oscillation at an excitation frequency which is approximately equal to, or equal to a nominal frequency, or to an integer multiple of said nominal frequency, with a master variation of rate value with respect to a reference, said rate adjustment and state of display correction device further comprising a state of display correction oscillator arranged to generate correction oscillation at a correction frequency, for adjusting the rate and correcting the state of display of a watch, or respectively a movement, said watch or respectively said movement comprising at least one basic oscillator arranged to generate oscillation at said nominal frequency.

The invention concerns the use of an automatic winder for mechanical or automatic watches, with at least one support for receiving a watch or respectively a movement, for subjecting at least one entire watch or respectively one entire movement to excitation oscillation generated by a master oscillator arranged to generate oscillation at an excitation frequency which is approximately equal to, or equal to a nominal frequency, or to an integer multiple of said nominal frequency, with a master variation of rate value with respect to a reference.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

It is proposed here to control, by means of a servo device, the frequency of at least one watch, or respectively a mechanical movement, having at least one oscillator, referred to hereafter as a 'basic oscillator' to differentiate it from so-called 'absolute' oscillators which can generate references, more particularly absolute references, and from oscillators that will be referred to as 'master oscillators', of intermediate quality between absolute oscillators and basic oscillators. A very high precision clock, which does not form part of the invention, but to which reference is made, may form a reference clock, with an absolute oscillator generating a reference frequency.

The invention applies equally to a timepiece, which may be a complete watch, a watch head or a movement. To simplify the description, the term "watch" will be used indiscriminately to designate any of these entities. Anything that applies to an entire watch is directly applicable to an entire movement, and vice versa.

In an innovative manner, each watch is fixed on a support, which is coupled to a reference time base. The support imparts an oscillating motion to the mechanical watch, which imposes a reference frequency on the basic oscillator comprised in the watch, particularly a balance/balance spring.

More particularly, a periodic back and forth motion is imparted to the entire watch, which has not been disassembled, in order to control the frequency of its mechanical resonator.

The servo device comprises a time base, which must be more accurate than that of the mechanical watch. It must therefore have an error of less than 1 second per day, advantageously less than 0.1 seconds per day, which can be achieved, in particular but not exclusively, with a temperature compensated quartz oscillator. A highly crafted mechanical pendulum can also achieve such accuracy.

Figure 1:
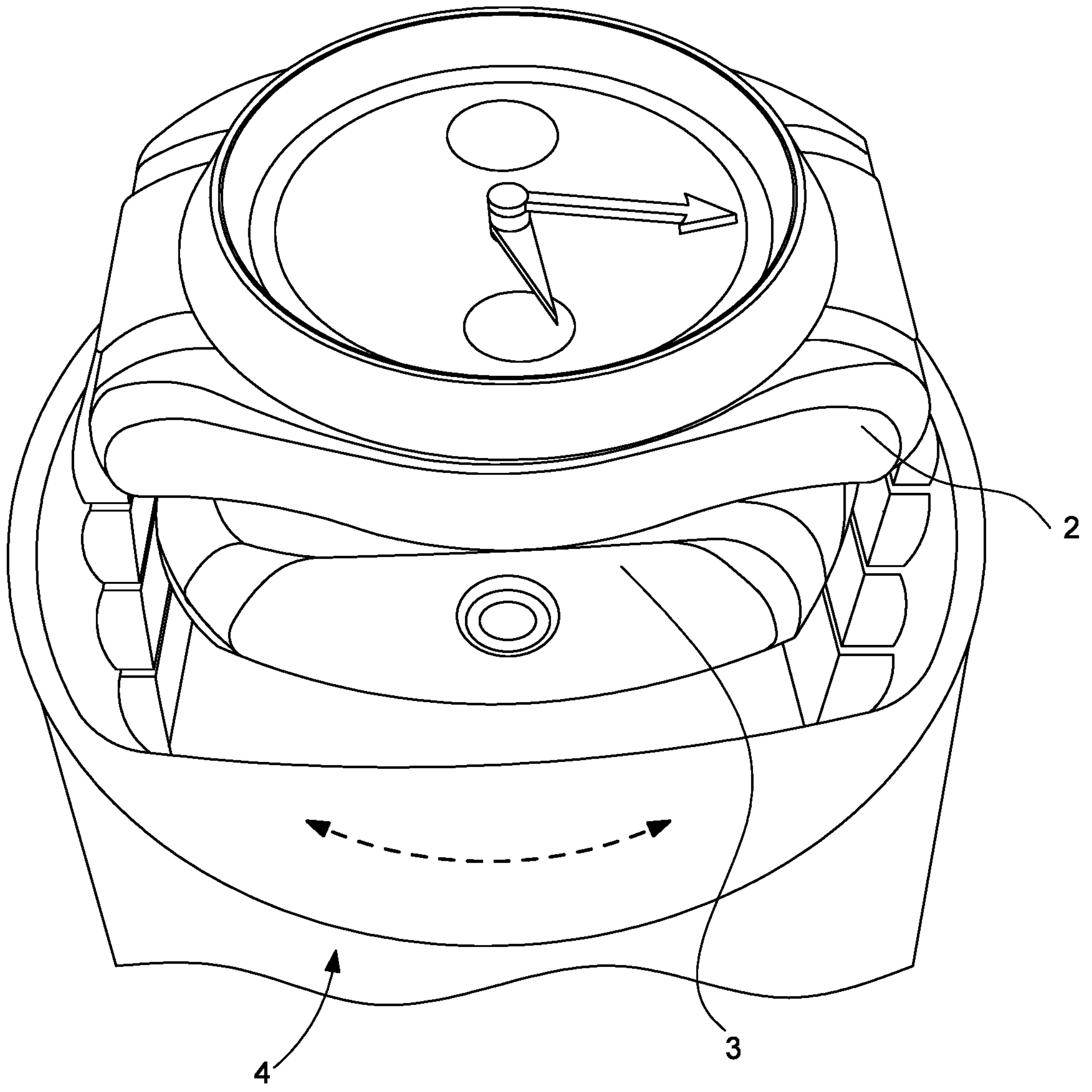
FIG. 1 represents schematically a watch or respectively a mechanical movement fixed to a support subjected to periodic excitation oscillation at a precise frequency by a function generator of a servo device, and rate measuring means, for example of the microphone type, in contact with the crown of the watch.
Figure 2:
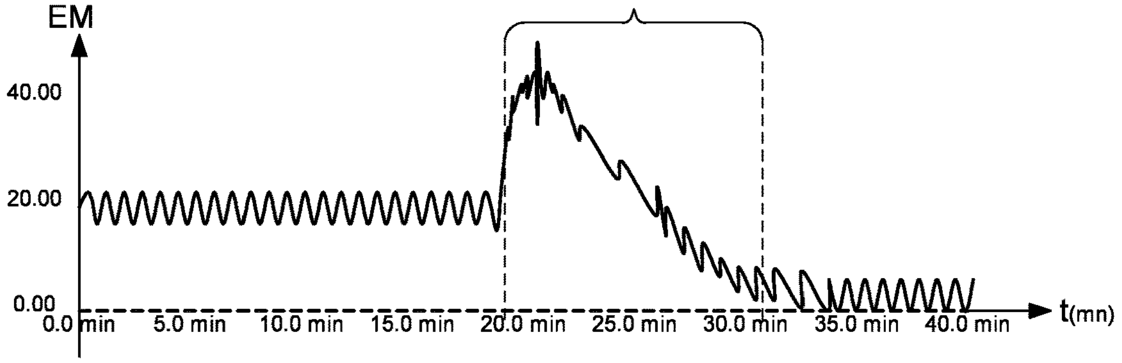
FIG. 2 is a diagram representing the evolution of rate, graduated in seconds per day on the ordinate, as a function of time graduated in minutes on the abscissa, of the watch of FIG. 1, from an initial moment, up to a steep ramp corresponding to the actuation of the servo device and to the oscillation of the support at an excitation frequency, which ramp is followed by a transition phase, during which the variation of rate is quickly reversed and then decreases steadily, until it reaches a stabilised, very low, substantially zero variation of rate value.

Controlling a watch by means of a servo device makes it possible to offset the variation of rate of the watch during the period that the watch is linked to the servo device, following a required transient synchronization regime, as shown in FIG. 2, which is extracted from a laboratory measurement with a watch displaying an initial variation of rate of around 15 seconds per day.

When the servo device is started, the variation of rate drifts during a transition phase of several minutes, then converges after around ten minutes on zero seconds per day.

Figure 3:
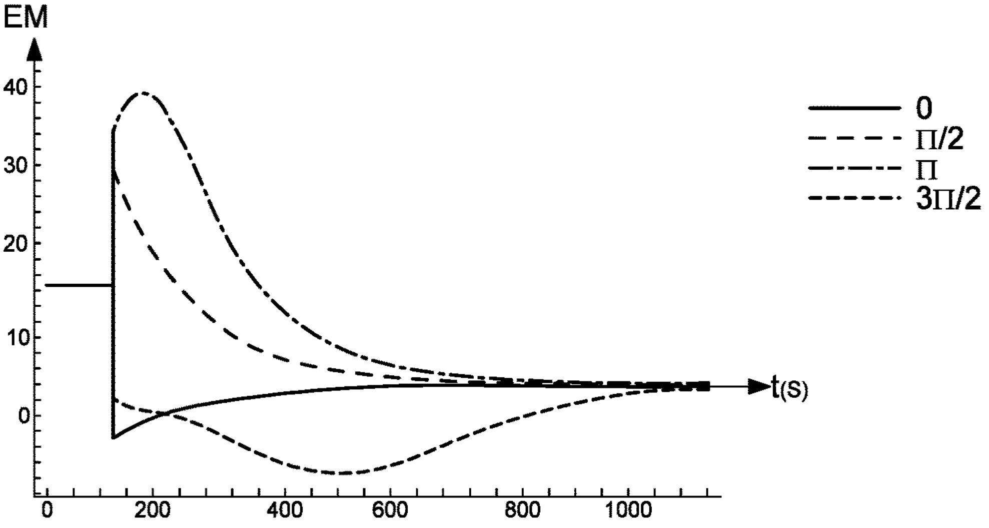
FIG. 3 is a similar diagram to that of FIG. 2, reduced simply to the transition phase, and which shows the effect of the excitation phase at the moment when excitation starts, which translates to curves of different appearance, but which all tend equally towards stabilisation around the zero value at the end of the transition phase.

This behaviour was modelled, and FIG. 3 shows that the shape of the curve during the transitional phase depends upon the excitation phase at the moment that it is started; FIG. 2 corresponds to a phase shift value $\pi$ which is, in fact, the worst case. Exploration of the space of the parameters shows that the difference in excitation must exceed a certain threshold for there to be synchronization, but it must not be too great, to avoid knocking. A large variation of rate can be offset by increasing the difference in excitation.

Thus, a first development concerns a method for adjusting the rate of a watch comprising at least one basic oscillator arranged to generate oscillation at a nominal frequency N0.

"Nominal frequency N0" means the target frequency value at which the oscillator of the watch or of the movement concerned is supposed to operate.

In an innovative manner, there is used a servo device comprising a master oscillator, which is arranged to generate excitation oscillation at an excitation frequency NE, which is approximately equal to, or equal to this nominal frequency N0, or to an integer multiple of nominal frequency N0, preferably with a master variation of rate value AM with respect to a reference, which is lower than the initial variation of rate value DI. More particularly, this reference is an absolute reference, which has a variation of rate of less than 1 second per day, advantageously less than 0.1 seconds per day.

More particularly, this master oscillator is arranged to generate excitation oscillation at an excitation frequency NE, which is approximately equal to, or equal to an odd integer multiple of nominal frequency N0.

This entire watch is subjected to excitation oscillation generated by the master oscillator, and/or to a modulated motion generated by the master oscillator, at excitation frequency NE, after an initial moment of actuation of the control device, at least during a transitional phase at the end of which the frequency of the oscillator of the watch or respectively of the movement is stabilised at frequency NE. The rate of the oscillator of the watch, which is slaved to the master oscillator, is then stabilised at a variation of rate value lower than or equal to master value AM.

More particularly, the initial variation of rate value DI of the basic oscillator of the watch is measured or evaluated beforehand, and this master oscillator, which has a master variation of rate value AM with respect to a reference that is lower than the initial variation of rate value DI, is selected and used. More particularly, this reference is an absolute reference, as defined above. The rate of the master movement and the rate of the basic slave movement are measured with respect to a very high precision clock, which does not form part of the invention.

In particular, the servo device is arranged to generate excitation oscillation, around an axis parallel to or coincident with that of the moving part of the basic oscillator of the watch concerned. The excitation oscillation preferably has a stroke of low angular amplitude, for example +/−5°, or even less, for example +/−2°.

In a first variant, used for the example of FIG. 2, the excitation oscillation is in the form of a back and forth motion.

In another variant, the master oscillator generates an excitation oscillation that imparts a modulated motion to the watch or to the movement concerned, for example with a unidirectional motion including rotations separated by jumps, or suchlike.

In short, this is a master/slave system, wherein a master oscillator of the servo device is the master, and the basic oscillator comprised in the watch is the slave.

This first development also concerns such a servo device, for adjusting the rate of a watch comprising at least one basic oscillator arranged to generate oscillation at a nominal frequency N0, with an initial measured variation of rate value DI.

In an innovative manner, this servo device comprises a master oscillator, which is arranged to generate excitation oscillation at an excitation frequency NE, which is approximately equal to, or equal to nominal frequency N0, or to an integer multiple, particularly an odd integer multiple, of nominal frequency N0, with a master variation of rate value AM with respect to a reference, which is lower than the initial variation of rate value DI. More particularly, this reference is an absolute reference as defined above, wherein the variation of rate is less than 1 second per day, or less than 0.1 seconds per day. This servo device is arranged to subject the entire watch to excitation oscillation generated by this master oscillator, and/or to a modulated motion generated by the master oscillator.

Figure 5:
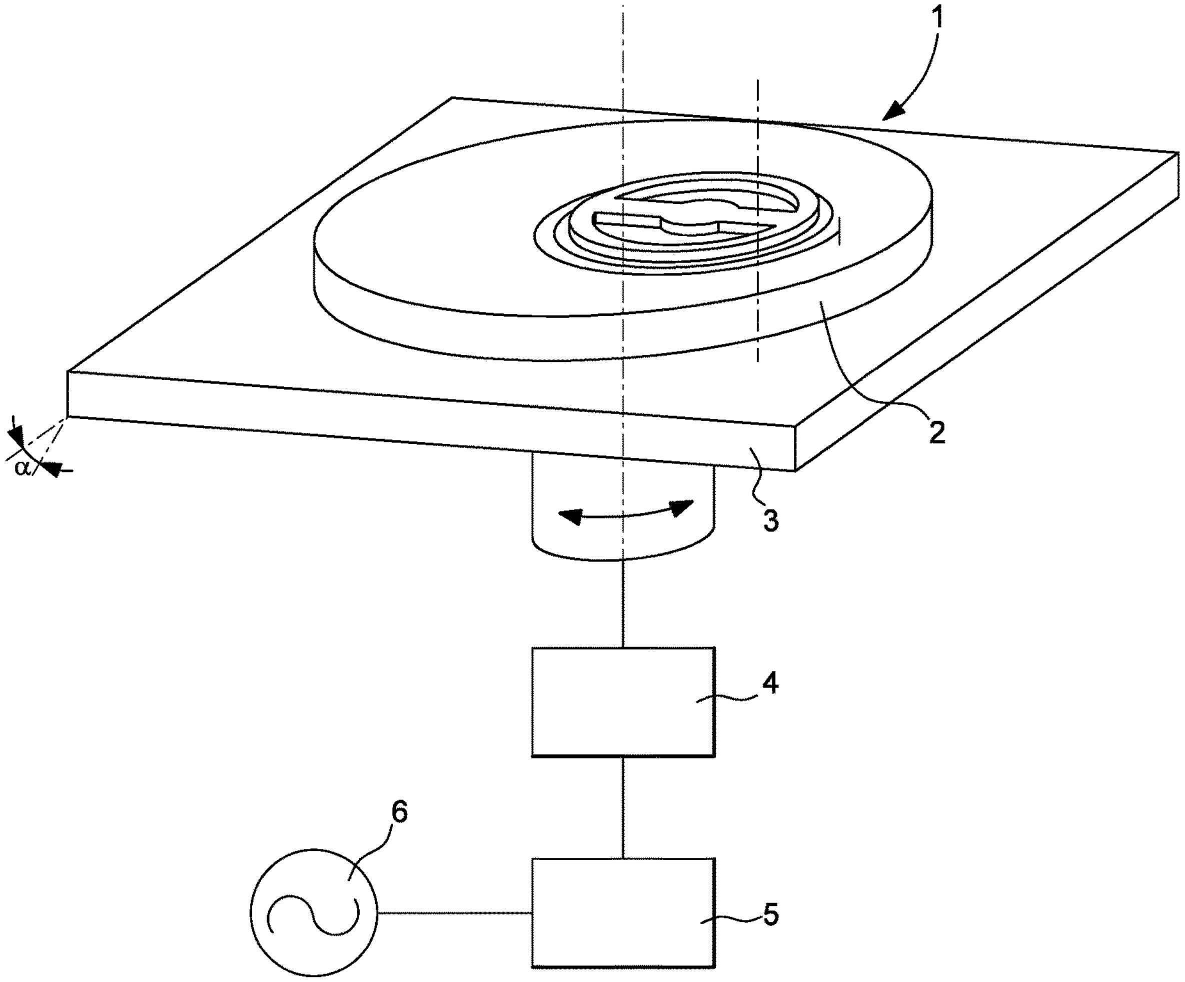
FIG. 5 is a schematic representation of a device for adjusting the rate of a watch or of a movement, comprising a reference oscillator, a frequency converter if necessary, for actuating a driver at an excitation frequency, wherein the driver drives a support bearing the watch or the movement that contains the basic oscillator.
Figure 6:
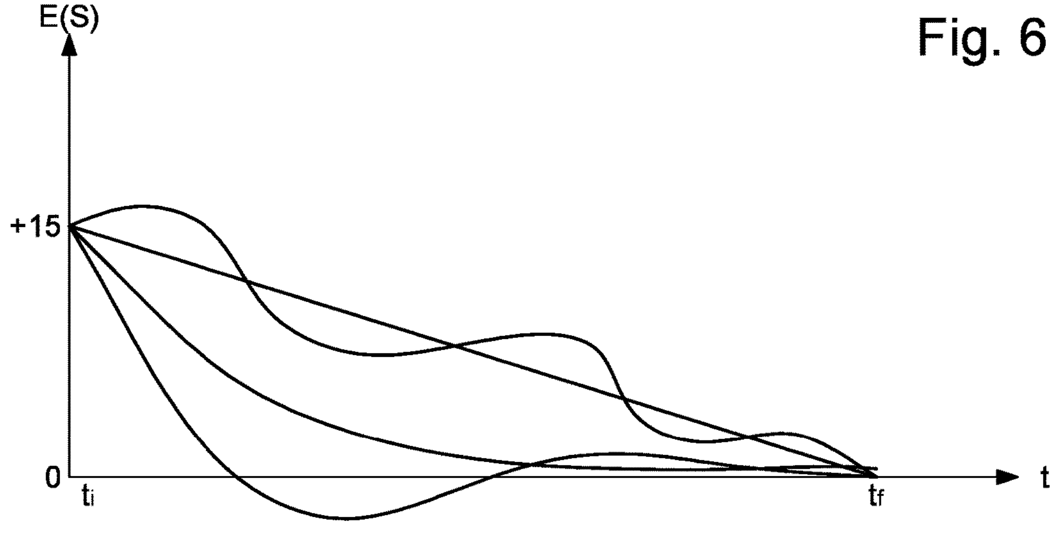
FIG. 6 is a diagram showing the evolution of state of display correction as a function of time.

In an advantageous embodiment, as seen in FIG. 5, the servo device includes a reference oscillator 6, and a frequency converter 5 if necessary, for actuating a driver 4 at excitation frequency NE.

This driver 4 imparts a motion, particularly a back and forth motion, about a reference axis, to a support 3, which carries the watch 2 to be servo-controlled, preferably with the axis of the oscillating part of basic oscillator 1 of watch 2 parallel to or coincident with the reference axis.

The angle of oscillation $\alpha$ is a function of time and is periodic. In particular, it is in the form: $\alpha(t)=A\cdot\sin(2\pi\cdot NE)$, or suchlike. It may also follow a square, saw-tooth or other cycle.

Such a servo device can adjust the rate of the watch, by selecting this particular excitation frequency NE in relation to nominal frequency N0. This same device can also be used, not at excitation frequency NE, but at a correction frequency NC, as will be seen below.

More particularly, this servo device includes control means, which are arranged to control the excitation oscillation of the master oscillator, and which are interfaced with means for measuring the rate of the watch, and which are comprised in this servo device.

Generally, the control means, main control means, central control means, which are described here can be formed by a computer, a calculator, a programmable controller, an integrated circuit, or any other means of artificial intelligence adapted to the application.

In a particular embodiment, this servo device comprises an automatic winder for mechanical or automatic watches, on which is fixed at least one support for receiving a watch or movement or suchlike. The servo device comprises, on this support, excitation means which are arranged to subject the entire watch to excitation oscillation generated by the master oscillator, and/or comprises drive means arranged to subject the entire watch to a modulated motion generated by this master oscillator.

More particularly, at least one rate measurement is made before and/or after stabilisation through implementation of this method. More particularly still, the measured variation of rate value is displayed or edited, on a display or editing means provided for this purpose.

It is understood that the rate adjustment is temporary, the servo control is temporary, while the watch remains subject to excitation oscillations generated by the master oscillator of the servo device.

It is important to note that this first development can offset both a gain and a loss: indeed, some watches leave the factory with a setting designed for running fast whereas others have a setting centred on the zero value, which means that these watches can gain as well as lose time. It it thus possible, to slow down a watch that is fast, or put forward a watch that is slow. It is to be noted that the rate of a watch that is already properly set is not altered.

This servo-control can be performed in addition to optimum winding of the movement, either in sequence, or simultaneously.

It is advantageous to take advantage of this first development in order, in a second development, to correct an error of state of display.

Indeed, this rate adjustment method, using a servo device, makes it possible to move the variation in rate towards zero seconds per day. However, the principle can also be used to slave the watch oscillator to another frequency, for example less 90 seconds per day, in order to correct a state of display error. This state of display error is either a measured and manually entered value or a value identified by a vision system, such as a camera with image processing for recognising the position of the hands or display members, or suchlike.

For example, the time of a watch is set perfectly at 7 am, and the watch is then worn all day with a constant variation of rate of +12 seconds per day, a state of display error of approximately +7.5 seconds is then measured at 10 pm on the same day. The user can implement the rate adjustment method with the rate servo-control device.

This servo device can be set, and is capable of imposing on the watch, over the next night, an imposed rate, which is not necessarily zero. For example, if the servo device imposes on the watch, for two hours, a variation of rate of less 90 seconds per day, the state of display of the watch is accurate again after this two-hour period.

After having performed this state of display correction, the device can then impose a variation of rate of 0 seconds per day until the user retrieves the watch. The time of the watch will thus be perfectly set in the morning: not only will it not have the state of display error that it would have had after one night at +12 seconds per day, but it will also have corrected the gain of 7.5 seconds accumulated when it was worn on the previous day. The table below summarizes this example:

| | Rate of the watch without the invention (in seconds per day) | State of display of the watch without the invention (in seconds) | Rate of the watch with the invention (in seconds per day) | State of display of the watch with the invention (in seconds) |
|---|---|---|---|---|
| Previous day at 7am | +12 | 0 | +12 | 0 |

-continued

| | Rate of the watch without the invention (in seconds per day) | State of display of the watch without the invention (in seconds) | Rate of the watch with the invention (in seconds per day) | State of display of the watch with the invention (in seconds) |
|---|---|---|---|---|
| Previous day at 10pm | +12 | +7.5 | +12 | +7.5 |
| Previous day from 10pm to midnight | +12 | from +7.5 to +8.5 | −90 | from +7.5 to 0 |
| Following day from midnight to 7am | +12 | from +8.5 to +12 | 0 | 0 |
| Following day at 7am | +12 | +12 | +12 | 0 |

Evidently, if the invention is not used, this state of display error accumulates over time and may reach several minutes per month if the user does not manually reset the time of his watch.

Figure 4:
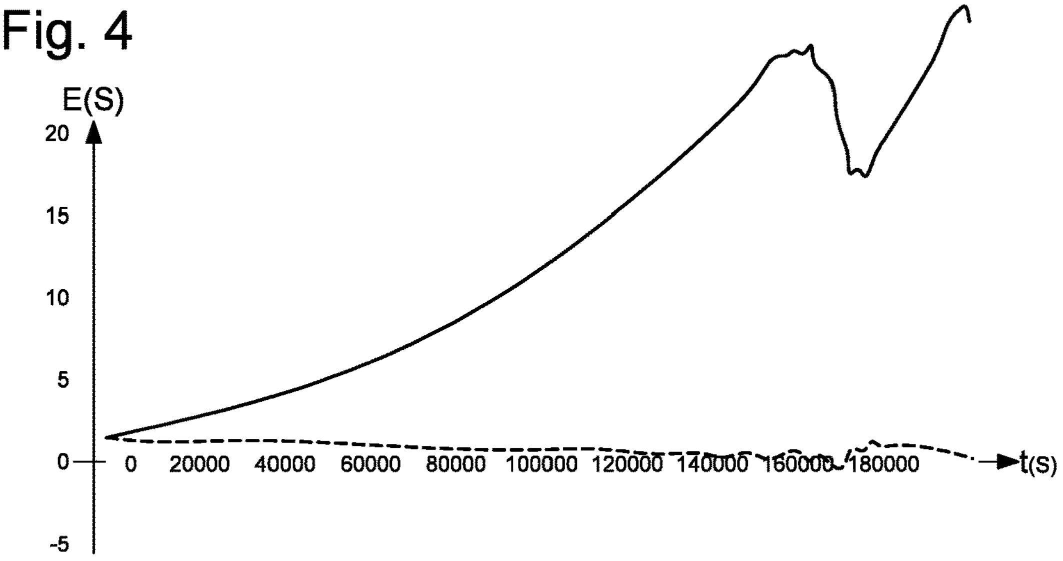
FIG. 4 is a diagram representing the evolution of the state of the watch of FIG. 1, graduated in seconds on the ordinate, graduated in minutes as a function of time on the abscissa, in a non servo-controlled variant in a solid line, and in a servo-controlled variant with a servo and state of display correction device, in a broken line.

FIG. 4 shows a comparative test result with and without the invention. In this example, the watch is a commercially available certified chronometer that has not been adjusted or modified, which has not been subjected to winding by an automatic winder or other means; the barrel of this watch unwinds naturally in just over 2 days (namely around 190,000 seconds). The state of display of the watch is measured using a precision instrument of the type used by watchmakers and clockmakers. The measurement of state of display is made over the entire unwinding period, in a dotted line in the servo-controlled state according to the invention, and in a solid line in the free state without the invention. FIG. 4 clearly shows that, without the invention, a watch or respectively a movement, even a certified chronometer, accumulates a significant loss as its barrel unwinds, whereas with the invention, its state remains very close to 0 seconds.

Thus, the second development concerns a method for correcting the state of display of a watch comprising at least one basic oscillator arranged to generate oscillation at a nominal frequency N0.

According to this state of display correction method, the initial variation of rate value DI is measured or evaluated. The state of display error is measured on the watch.

There is used a state of display correction device comprising a state of display correction oscillator, which is arranged to generate oscillation at a correction frequency NC to impose oscillation and/or a motion on the entire watch, during a state of display correction phase after an initial moment of actuation of the state of display correction device. The duration of the state of display correction phase is adjusted to exactly correct a state of display error measured or evaluated on the watch at the initial moment of actuation.

More particularly, the initial variation of rate value DI of this basic oscillator is measured, and there is selected and used a state of display correction device comprising a state of display correction oscillator that has a variation of rate value with respect to a reference, which is lower than initial variation of rate value DI. More particularly, this reference is an absolute reference as defined above.

Of course, the state of display correction device may be the servo device presented above, provided it has frequency generation means for obtaining the required correction frequency NC.

It is clear that duration D, during which oscillation must be applied at a correction frequency NC to correct a variation of state E, is defined by the relation: $D=(tf-ti)=E/(NC-N0)$.

However, naturally, correction frequency NC cannot be selected haphazardly, since it must not needlessly move away from the resonance frequency, and, in practice, the difference (NC−N0) should preferably be limited to around +/−100 seconds per day.

The state of display correction can be implemented independently of the rate adjustment and utilise a state of display correction device.

This state of display correction device is arranged to correct the state of a watch comprising at least one basic oscillator arranged to generate oscillation at a nominal frequency N0, with a measured initial variation of rate value DI. In this second development, this state of display correction device includes a state of display correction oscillator, which is arranged to generate correction oscillation at a correction frequency NC. This state of display correction device is arranged to subject the entire watch to correction oscillation generated by the state of display correction oscillator, and/or a modulated motion generated by this state of display correction oscillator.

More particularly, this state of display correction device comprises control means, which are arranged to control the oscillation of the state of display correction oscillator, and which are interfaced with means for measuring the state of the watch, and comprised in the state of display correction device.

Advantageously, these control means are interfaced with means for manual entry by the user of a state of display correction duration, and/or are arranged to calculate this duration, as a function of the values of nominal frequency N0, correction frequency NC, and the measured variation of state.

More particularly, the means for measuring the state of the watch are optical vision means, which are advantageously supplemented by image processing means, particularly for recognising the position of the hands or display members of the watch, or respectively the position of marks on the wheel sets of the movement.

In a variant, in the absence of automatic image processing means, the state of display correction device comprises control means that are arranged to control the correction oscillation of the state of display correction oscillator, and which are interfaced with means for manual entry by the user of a displayed time or of a variation of state, such as a keyboard, or touch interface or suchlike, or interfaced by a wireless communication means with a mobile telephone, or "smartphone" or "iPhone" or suchlike, which includes such manual entry means.

Figure 7:
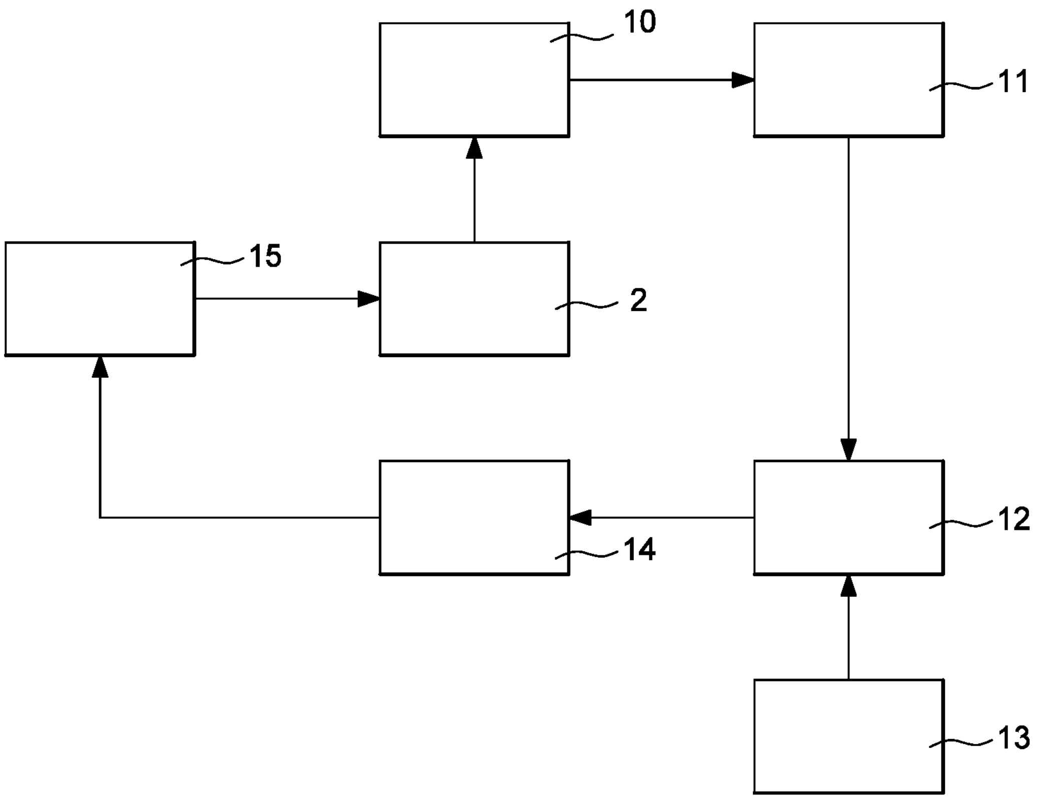
FIG. 7 is a block diagram of the state of display correction of a watch, with means for measuring the state of the watch, such as a camera, interfaced with recognition means, a cell for calculating a difference in state by comparison to an absolute state reference, a cell for calculating the frequency and correction time, and a device for servo control of rate Of the watch.

FIG. 7 illustrates one such device for correcting the state of display of a watch 2, with means 10 for measuring the state of the watch, such as a camera, interfaced with recognition means 11, a cell 12 for calculating the difference in state by comparison to a state reference 13, a cell 14 for calculating the frequency and correction duration, and a rate servo-control device 15. More particularly, this state reference 13 is an absolute reference as defined above.

In a particular embodiment, this state of display correction device comprises an automatic winder for mechanical or automatic watches with at least one support for receiving a watch or respectively a movement, The state of display correction device comprises, in this support, excitation means, which are arranged to subject the entire watch, or respectively the entire movement, to correction oscillation generated by this state of display correction oscillator, and/or drive means which are arranged to subject the entire watch, or respectively the entire movement, to a modulated motion generated by the state of display correction oscillator.

The invention can combine the two actions described above, in the form of a method for adjusting the rate and correcting the state of display of a watch comprising at least one basic oscillator arranged to generate oscillation at a nominal frequency N0, with an initial variation of rate value DI, and wherein the state of display correction phase and the transition phase of the two respective basic methods are at least partially performed one after the other.

The invention then implements a rate adjustment and state of display correction device for a watch comprising at least one basic oscillator arranged to generate oscillation at a nominal frequency N0, with a measured initial variation of rate value DI. According to the invention, this rate adjustment and state of display correction device comprises at least one such servo device, and at least one such state of display correction device, and main control means, which are arranged to control the excitation oscillation of the master oscillator and which are interfaced with means for measuring the variation of rate of the watch, comprised in the servo device, and to control the correction oscillation of the state of display correction oscillator, and which are interfaced with means for measuring the state of the watch, comprised in this state of display correction device.

More particularly, this rate adjustment and state of display correction device comprises at least one automatic winder for mechanical or automatic watches, on which at least one such support is fixed.

The invention also concerns an interactive support device for correcting a watch, comprising at least one such servo device, and this interactive correction support device comprises central rate control means for adjusting to an identical variation of rate value all the watches subjected to the servo devices.

More particularly, this interactive support device for correcting a watch comprises at least one such state of display correction device, and this interactive correction support device comprises central state control means for adjusting to an identical state value all the watches subjected to the state of display correction devices.

More particularly still, this interactive correction support device comprises main control means which form or coordinate the central rate control means and central state control means.

More particularly, this interactive correction support device includes at least one automatic winder for mechanical or automatic watches, on which is fixed at least one support for receiving a watch or respectively a movement.

In an advantageous application, this interactive correction support device is a display unit for displaying watches and/or movements to the user or to the public.

More particularly still, this display unit is designed to receive a plurality of watches and/or movements having the same nominal frequency N0.

It is possible to servo-control the various watches with a single system if the watches are identical, for example, or individually with separate commands if they are different (settings, models, brands, or otherwise).

It is also possible to have different categories, and thus for the servo controls and/or state of display corrections to differ between categories, or between watches, if necessary.

The invention also concerns a watch that comprises at least one basic oscillator arranged to generate oscillation at a nominal frequency N0, with an initial measured variation of rate value DI, which watch comprises a watch band having at least one such servo device.

More particularly, the watch band comprises at least one state of display correction device, but which is much more difficult to incorporate. Thus, more particularly, this state of display correction device, incorporated in the watch band, comprises control means that are arranged to control the correction oscillation of the state of display correction oscillator, and which are interfaced with means for manual entry by the user of a displayed time or of a variation of state, such as a keyboard, or interface, or are interfaced with a communication means, such as a mobile telephone, or smartphone or iPhone or suchlike, which includes such manual entry means.

A particular embodiment concerns a watch band comprising, in addition to the watch head, the oscillating servo system and the energy source.

In another embodiment, this watch comprises means for resonating its plate at nominal frequency N0, or at an integer multiple, particularly an odd integer multiple, of nominal frequency N0.

The invention also concerns the use of a servo device comprising a master oscillator arranged to generate oscillation at an excitation frequency NE, which is approximately equal to, or equal to a nominal frequency N0, or to an integer multiple, particularly an odd integer multiple, of nominal frequency N0, with a master variation of rate value AM with respect to a reference, for adjusting the rate of a watch. More particularly, this reference is an absolute reference, as defined above, wherein the variation of rate is less than 1 second per day, advantageously less than 0.1 seconds per day. This watch includes at least one basic oscillator, which is arranged to generate oscillation at nominal frequency N0, with any initial variation of rate value DI. This rate adjustment is made by subjecting the entire watch to excitation oscillation generated by the master oscillator, and/or to a modulated motion generated by the master oscillator, for a sufficient duration to stabilise the variation of rate of the watch oscillator at a variation of rate value lower than or equal to master value AM.

The invention also concerns the use of a state of display correction device comprising a master oscillator arranged to generate oscillation at an excitation frequency NE, which is approximately equal to, or equal to a nominal frequency N0, or to an integer multiple, particularly an odd integer multiple, of said nominal reference N0, with a master variation of rate value AM with respect to a reference, and comprising a state of display correction oscillator arranged to generate correction oscillation at a correction frequency NC, for correcting the state of display of a watch. More particularly, this reference is an absolute reference as defined above. This watch includes at least one basic oscillator arranged to generate oscillation at said nominal frequency N0, with any initial variation of rate value DI. This state of display correction is made by subjecting the entire watch to correction oscillation generated by the state of display correction oscillator, and/or to a modulated motion generated by the state of display correction oscillator, for a sufficient duration to perform the required correction of the state of the watch, or respectively of the movement.

The invention also concerns the use of a device for adjusting the rate and correcting the state of display of a watch. This rate adjustment and state of display correction device comprises a master oscillator, which is arranged to generate excitation oscillation at an excitation frequency NE, which is approximately equal to, or equal to said nominal frequency N0, or to an integer multiple, particularly an odd integer multiple, of said nominal frequency N0, with a master variation of rate value AM with respect to a reference for adjusting the rate of a watch. More particularly, this reference is an absolute reference, as defined above, wherein the variation of rate is less than 1 second per day, advantageously less than 0.1 seconds per day. This watch includes at least one basic oscillator, which is arranged to generate oscillation at nominal frequency N0, with any initial variation of rate value DI. This rate adjustment is made by subjecting the entire watch to excitation oscillation generated by the master oscillator, and/or to a modulated motion generated by the master oscillator, for a sufficient duration to stabilise the variation of rate of the watch oscillator at a variation of rate value lower than or equal to master value AM. The rate adjustment and state of display correction device comprises a state of display correction oscillator, which is arranged to generate oscillation at a correction frequency NC to correct the state of the watch, by subjecting the entire watch to correction oscillation generated by the state of display correction oscillator, and/or to a modulated motion generated by the state of display correction oscillator, for a sufficient duration to perform the required correction of the state of the watch.

The invention also concerns the use of an automatic winder for mechanical or automatic watches, with at least one support for receiving a watch or movement or suchlike, for subjecting at least one entire watch to excitation oscillation generated by a master oscillator arranged to generate excitation oscillation at an excitation frequency which is approximately equal to, or equal to a nominal frequency N0, or to an integer multiple, particularly an odd integer multiple, of said nominal frequency N0, with a master variation of rate value AM with respect to a reference for adjusting the rate of a watch. More particularly, this reference is an absolute reference, as defined above, wherein the variation of rate is less than 1 second per day, advantageously less than 0.1 seconds per day, for adjusting the rate of a watch. This watch includes at least one basic oscillator arranged to generate oscillation at said nominal frequency N0, with any initial variation of rate value DI.

This automatic winder includes excitation means, which are arranged to subject the entire watch to excitation oscillation generated by the master oscillator, and/or drive means arranged to subject the entire watch to a modulated motion generated by the master oscillator. This rate adjustment is made by subjecting the entire watch to excitation oscillation generated by the master oscillator, and/or to a modulated motion generated by the master oscillator, for a sufficient duration to stabilise the variation of rate of the watch oscillator at a variation of rate value lower than or equal to master value AM. The rate adjustment and state of display correction device comprises a state of display correction oscillator, which is arranged to generate oscillation at a correction frequency NC to correct the state of the watch, by subjecting the entire watch to correction oscillation generated by the state of display correction oscillator, and/or to a modulated motion generated by the state of display correction oscillator, for a sufficient duration to perform the required correction of the state of the watch.

It is understood that the rate adjustment and the state of display correction are not performed at the same moment. However, both can be conducted successively, in a reduced time period, for example in one night, or during a time when the user does not need to use his watch.

The invention offers several remarkable advantages:

its implementation is compatible with all mechanical watches having at least one resonator with an oscillator that is mechanical, coaxial or has a Swiss lever escapement;

its implementation does not require any intervention in the watch, and in particular does not require opening the case;

the watch or of the movement can be in any angular position on its support;

in case of implementation of a servo or state of display correction device having an automatic winder, a mechanical or automatic watch can remain wound and also perfectly set to time;

It is possible to correct a state of display error by imposing a reverse variation of rate for a certain time;

It is also possible to correct watches that run slow, and which have a negative rate of several seconds per day;

the principle of servo-control of a zero variation of rate does not necessarily require feedback; whereas the state of display correction requires knowledge of the state of the display members or hands, notably by vision means;

the user can decide freely, and in a reversible manner, to make his watch run fast or slow.

Of course, although the invention is designed to make rate adjustments and state of display corrections without opening the watch and without separating the movement from the case, it applies a priori simply to a movement.

In a particular variant, the invention applies to adjustment of the rate of an electronic watch, obviously with a master oscillator having a variation of rate substantially lower than that of normal electronic watches.

What is claimed is:

1. A state of display correction device for correcting the state of display of a watch or respectively of a movement, said watch or respectively said movement including at least one basic oscillator arranged to generate oscillation at a nominal frequency N0, with an initial variation of rate value DI, the state of display correction device comprising:

a state of display correction oscillator arranged to generate oscillation at a correction frequency NC; and control means arranged to control the oscillation of said state of display correction oscillator, wherein said state of display correction device is arranged to subject said entire watch or respectively said entire movement to oscillation generated by a master oscillator and to a modulated motion generated by said state of display correction oscillator, and wherein the control means is interfaced with means for measuring the state of said watch or respectively of said movement, comprised in said state of display correction device.

2. The state of display correction device according to claim 1, wherein said means for measuring the state of said watch or respectively of said movement are optical vision and image processing means.

3. The state of display correction device according to claim 1, wherein said control means is interfaced with means for manual entry of a displayed time or of a variation of state by the user.

4. The state of display correction device according to claim 1, wherein said state of display correction device comprises an automatic winder for mechanical or automatic watches, said automatic winder comprising at least one support for receiving a watch or respectively a movement, said state of display correction device includes excitation means in said support and arranged to subject said entire watch, or respectively said entire movement, to oscillation generated by said state of display correction oscillator, and/or drive means arranged to subject said entire watch, or respectively said entire movement, to the modulated motion generated by said state of display correction oscillator.

5. A device for adjusting the rate and correcting the state of display of the watch or respectively of the movement, said watch or respectively said movement comprising the at least one basic oscillator arranged to generate oscillation at the nominal frequency N0, with the initial variation of rate value DI, the rate adjustment and state of display correction device comprising:

at least one servo device for adjusting the rate of a watch or respectively of a movement, said watch or respectively said movement comprising the at least one basic oscillator arranged to generate oscillation at the nominal frequency N0, with the initial variation of rate value DI, wherein said servo device comprises a master oscillator arranged to generate excitation oscillation at an excitation frequency NE which is approximately equal to, or equal to said nominal frequency NO, or to an integer multiple of said nominal frequency N0, with a master variation of rate value AM with respect to a reference, which is lower than said initial variation of rate value DI, and wherein said servo device is arranged to subject said entire watch or respectively said entire movement to the excitation oscillation generated by said master oscillator and/or to a modulated motion generated by said master oscillator;

at least one state of display correction device according to claim 1; and main control means, which are arranged to control the excitation oscillation of said master oscillator and interfaced with means for measuring the variation of rate of said watch or respectively said movement, comprised in said at least one servo device, and to control the oscillation of said state of display correction oscillator and interfaced with means for measuring the state of said watch or respectively of said movement, comprised in said at least one state of display correction device.

6. An interactive support device for correction of the watch or respectively the movement comprising at least one servo device, for adjusting the rate of a watch or respectively of a movement, said watch or respectively said movement comprising the at least one basic oscillator arranged to generate oscillation at the nominal frequency N0 with the initial variation of rate value DI, wherein said servo device comprises a master oscillator arranged to generate excitation oscillation at an excitation frequency NE which is approximately equal to, or equal to said nominal frequency N0, or to an integer multiple of said nominal frequency N0, with a master variation of rate value AM with respect to a reference, which is lower than said initial variation of rate value DI, and wherein said servo device is arranged to subject said entire watch or respectively said entire movement to excitation oscillation generated by said master oscillator and/or to the modulated motion generated by said master oscillator, the interactive correction support device comprising:

central means for controlling rate for adjusting to an identical variation of rate value all watches subjected to said servo devices;

at least one state of display correction device according to claim 1; and central state control means for adjusting to an identical state value all watches subjected to said state of display correction devices.

7. The interactive support device for correcting a watch or respectively a movement according to claim 6, wherein said interactive correction support device comprises main control means forming or coordinating said central state control means and said central state control means.

8. The interactive support device for correcting a watch or respectively a movement according to claim 6, wherein said interactive correction support device comprises at least one automatic winder for mechanical or automatic watches, at least one support for receiving a watch or respectively a movement is fixed on the at least one automatic winder.

9. The interactive support device for correcting a watch or respectively a movement according to claim 6, wherein said interactive correction support device is a display unit for displaying watches and/or movements to the public.

10. A watch comprising the at least one basic oscillator arranged to generate oscillation at the nominal frequency N0, with the initial variation of rate value DI, the watch comprising:

a watch band comprising at least one servo device for adjusting the rate of a watch or respectively of a movement, said watch or respectively said movement comprising at least one basic oscillator arranged to generate oscillation at a nominal frequency N0 with an initial variation of rate value DI, wherein said servo device comprises a master oscillator arranged to generate excitation oscillation at an excitation frequency NE which is approximately equal to, or equal to said nominal frequency N0, or to an integer multiple of said nominal frequency N0, with a master variation of rate value AM with respect to a reference, which is lower than said initial variation of rate value DI, and wherein said servo device is arranged to subject said entire watch or respectively said entire movement to excitation oscillation generated by said master oscillator and/or to a modulated motion generated by said master oscillator; and at least one state of display correction device according to claim 1.

11. The watch according to claim 10, wherein said watch comprises a plate and a means for resonating the plate at said nominal frequency N0, or at an integer multiple of said nominal frequency N0.

12. An use of a state of display correction device according to claim 1, comprising:

a master oscillator arranged to generate excitation oscillation at the nominal frequency N0, or at an integer multiple of said nominal frequency N0, with a master variation of rate value AM with respect to a reference; and a state of display correction oscillator arranged to generate oscillation at the correction frequency NC to correct the state of the watch or respectively the movement, said watch or respectively said movement comprising the at least one basic oscillator arranged to generate oscillation at said nominal frequency N0, with the initial variation of rate value DI higher than said master value AM, by subjecting said entire watch or respectively said entire movement to oscillation generated by said state of display correction oscillator and/or to the modulated motion generated by said state of display correction oscillator, for a sufficient duration to perform a required correction of the state of said watch or respectively said movement.

13. A device for adjusting the rate and correcting the state of display of the watch or respectively of the movement according to claim 5, said watch or respectively said movement comprising the at least one basic oscillator arranged to generate oscillation at the nominal frequency N0, with the initial variation of rate value DI, said rate adjustment and state of display correction device comprising the master oscillator arranged to generate the excitation oscillation at the excitation frequency NE which is approximately equal to, or equal to the nominal frequency N0, or to an integer multiple of said nominal frequency N0, with the master variation of rate value AM with respect to a reference, for adjusting the rate of a watch or respectively a movement, said watch or respectively said movement comprising at least one basic oscillator arranged to generate oscillation at said nominal frequency N0, with an initial variation of rate value DI higher than said master value AM, by subjecting said entire watch or respectively said entire movement to the excitation oscillation generated by said master oscillator and/or to the modulated motion generated by said master oscillator, for a sufficient duration to stabilise the variation of rate of the basic oscillator of said watch or respectively of said movement at a difference in variation of rate that is lower than or approximately equal to, or equal to said master value AM, and said rate adjustment and state of display correction device comprising a state of display correction oscillator arranged to generate oscillation at the correction frequency NC to correct the state of said watch or respectively of said movement, by subjecting said entire watch or respectively said entire movement to oscillation generated by said state of display correction oscillator and/or to the modulated motion generated by said state of display correction oscillator, for a sufficient duration to perform a required correction of the state of said watch or respectively said movement.

* * * * *